No. 848,440. PATENTED MAR. 26, 1907.
G. F. BURTON.
ROTARY ENGINE.
APPLICATION FILED SEPT. 14, 1906.

No. 848,440. PATENTED MAR. 26, 1907.
G. F. BURTON.
ROTARY ENGINE.
APPLICATION FILED SEPT. 14, 1906.

No. 848,440. PATENTED MAR. 26, 1907.
G. F. BURTON.
ROTARY ENGINE.
APPLICATION FILED SEPT. 14, 1906.

Witnesses
Geo. A. Byrne
W. May. Duvall

Inventor
George F. Burton
by Wilkinson & Fisher
Attorneys.

THE NORRIS PETERS CO., WASHINGTON, D. C.

No. 848,440. PATENTED MAR. 26, 1907.
G. F. BURTON.
ROTARY ENGINE.
APPLICATION FILED SEPT. 14, 1906.

No. 848,440. PATENTED MAR. 26, 1907.
G. F. BURTON.
ROTARY ENGINE.
APPLICATION FILED SEPT. 14, 1906.

Witnesses
Geo. H. Byrne.
W. May. Duvall.

Inventor
George F. Burton,
by Wilkinson + Fisher,
Attorneys

UNITED STATES PATENT OFFICE.

GEORGE F. BURTON, OF WOODLAWN, ALABAMA.

ROTARY ENGINE.

No. 848,440.     Specification of Letters Patent.     Patented March 26, 1907.

Application filed September 14, 1906. Serial No. 334,619.

*To all whom it may concern:*

Be it known that I, GEORGE F. BURTON, a citizen of the United States, residing at Woodlawn, in the county of Jefferson and State of Alabama, have invented certain new and useful Improvements in Rotary Engines; and I do hereby declare the following to be a full, clear, and exact description of the invention, such as will enable others skilled in the art to which it appertains to make and use the same.

My invention relates to improvements in rotary engines driven by steam, compressed air, or other fluid-pressure, in which there is a continuous torque maintained on the shaft and in which the valve mechanism is of extremely simple type and the wear on the parts is reduced to a very small amount.

In the accompanying drawings I have shown the invention as applied to a four-cylinder direct-acting rotary engine, in which each cylinder is supplied with live steam from a common supply-pipe; but I intend the invention to be used also with compound engines, if desired, which may be accomplished by making some of the cylinders larger than others and by supplying the lower-pressure cylinders with steam from the higher-pressure cylinders.

My invention will be understood by reference to the accompanying drawings, in which the same parts are indicated by the same letters throughout the several views.

A represents a casting. There is one at each end of the machine, which casting is provided with a journal-bearing A' for the shaft B, connected to the outer casing $A^2$ and perforated to receive the exhaust-pipe C. I have shown an exhaust-pipe at each end of the machine, but only one may be used, if desired.

Secured to the flanges $a^2$ of the outer casing $A^2$ are the division-plates D, to which the flanges $e$ of the outer shell E are connected. With a four-cylinder engine, as shown, there would be three of these division-plates and two of the outer shells; but the number of cylinders, division-plates, and outer shells may be varied indefinitely. Preferably the two outer cylinders are inclosed in the outer casing, forming part of the casing at each end of the machine; but shells similar to the outer shells E may be used for these two cylinders also, if desired.

Keyed on the shaft B are a series of disks F, which are chambered, as at $F^0$, and are provided with lateral openings $f^0$ for the passage therethrough of the exhaust. Each of these disks F carries the piston H, which is pivotally connected to the disk by the pin I, and these pistons are pivoted near their other end to the pin I', which projects through the piston and has its ends engaging the sides of the inner shell K. This inner shell rotates in the outer shell or casing, which is eccentric to the axis of the shaft B, so that as the shaft B rotates the inner shell K, being connected to the disk F by the pin I', will be caused to move eccentrically to the shaft B.

Each inner shell K is provided with an elongated port $k$ to permit steam to enter the interior of said shell during a portion only of each revolution of said shell. I have shown these ports as extending through about one-fourth of the circumference of the shell; but the length of the port may be varied to suit varying conditions.

The steam is supplied to the engine from a suitable steam-chest—such, for instance, as the pipe M connected to the main pipe M'. This pipe M has a plurality of branches $M^2$, each connected to a port $m$. These ports $m$ are lined with bronze bushings $n$, which are pressed against the cylindrical face of the shell K by means of the spring N', which spring presses against $N^2$ in front of the asbestos packing $n^2$. The other end of the spring engages a shell $n^3$, pressed down by the arms $n^4$ on the cap $N^4$. This cap is held in place in any convenient way, as by means of the tap-bolts $n^5$.

Most of the wear of the machine is that between the bushing N and the shell K, and by making this bushing N of soft material, such as bronze, the wear will be practically all on the bushing and a new bushing may be inserted whenever desired.

In order to make a snug fit and prevent the wear of shoulders on the shell K, I provide grooves $k^0$ at each side of the raised wear-surface $k'$ so that it will wear down a smooth face on the shell without burring the edges.

It will be noted that as each inner shell revolves its steam-port will be brought under the port $m$ and the steam will continue to flow in until the port $k$ has moved past the port $n$, when the steam will be cut off, and thereafter the steam will be cut off from that cylinder until the port rotates to the open position. By having the ports of the various rings set at different angles relative to the shaft B it will be evident that the steam-port may be always kept open on one of the shells of the series, so that there is no dead-center position.

The steam acts expansively after entering the cylinder, as will now be described.

Figure 3:
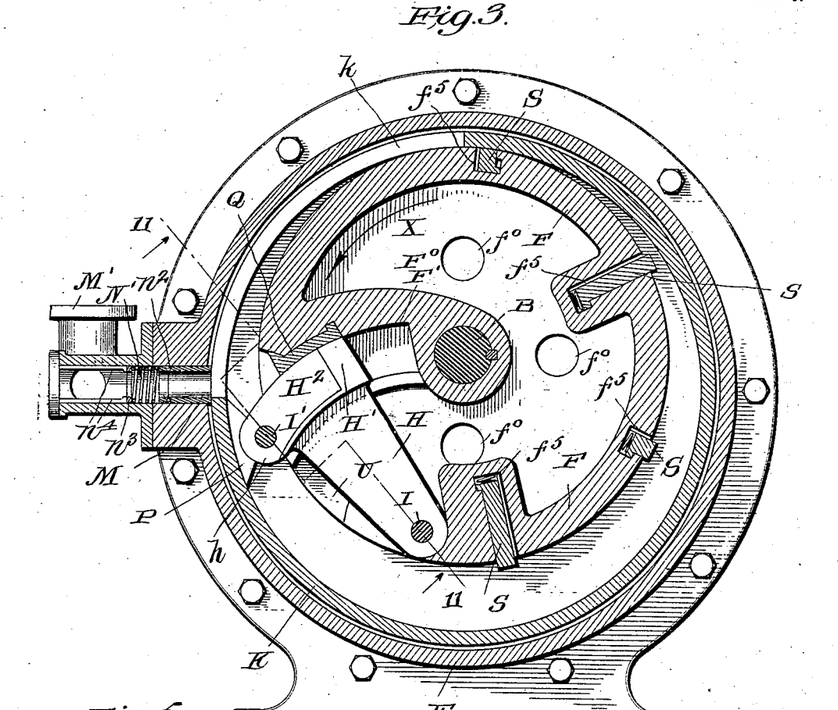
Fig. 3 shows a section along the line 3 3 of Fig. 2 and looking in the direction of the arrows, the parts being in the position when the steam-port is just fully open.
Figures 15, 16, 17:
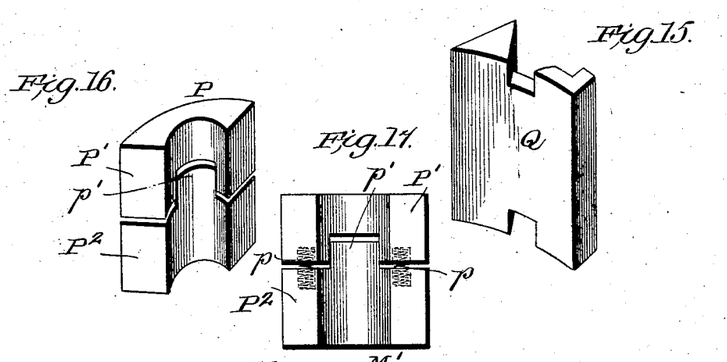
Fig. 15 is a detail showing one of the piston-packing blocks.
Fig. 16 is a detail showing the saddle carried by the piston to close the passage from the steam to the exhaust side of the piston.
Fig. 17 is a side view of the saddle shown in Fig. 16 as seen from the axis of the driving-shaft.

Each cylinder H is provided with a saddle P, which forms a packing-block between the swinging piston and the inner wall of the shell K. This packing-block is curved on its interior to allow the lug $h$ of the piston to rock therein, as shown in Fig. 3, and in order to allow for lateral wear this saddle is preferably made of two members P' and $P^2$, pressed apart by the springs $p$. These two members are connected together by a tongue-and-groove engagement $p'$, so as to allow longitudinal play, but to form a substantial steam-tight joint, as shown in Figs. 16 and 17.

The head of the piston H' is curved to swing into the socket F' in the disk F, and the passage of steam past the piston to the interior of the disk is prevented by the packing-block Q (see Fig. 15) and also by the curved side blocks $H^2$, which are pressed outward by springs $h^2$, engaging in sockets $h^3$. These side blocks $H^2$ are perforated to receive the pin I'. The back of the piston-head fits snugly against the curved rear wall of the socket and takes the strain off the pin I.

Figure 8:
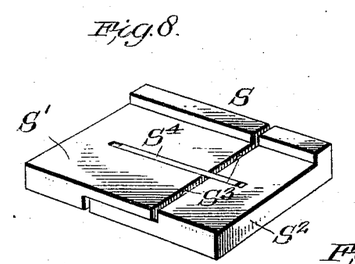
Fig. 8 is a perspective view of one of the extensible packing-bars used in the rotary disk.
Figure 9:
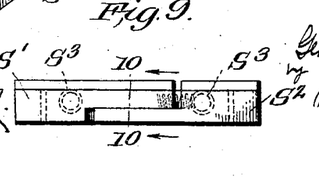
Fig. 9 is an end view of the device shown in Fig. 8.
Figure 10:
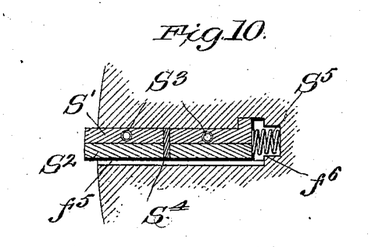
Fig. 10 shows a section along the line 10 10 of Fig. 9 and looking in the direction of the arrows and also shows a part of the disk in which it is seated.

The sides of the disk F are kept steam-tight by the divided packing-rings R, which are pressed outward by the springs R', and steam is prevented from passing from the steam to the exhaust side of the disk around its periphery by means of the packing-bars S. (Shown in detail in Figs. 8, 9, and 10.) These bars are preferably made in two parts S' and $S^2$, which are forced apart by the springs $S^3$, and the passage of steam through the opening between these springs is prevented by the plate $S^4$, which is mounted to slide in a slot in the two members of the block, as shown in Figs. 8 to 10. These blocks are pressed outward by springs $S^5$, mounted in chambers $f^6$ in the disk F, and these chambers $f^6$ are connected to the exterior of the disk by outlets $f^5$, so that the steam may press on both edges of the block, and thus the springs may operate regardless of the pressure of the steam. These blocks are L-shaped to prevent being thrown out too far. The divided rings R have only a very slight sliding motion relative to the inner shell, so that the wear is comparatively slight.

Figure 1:
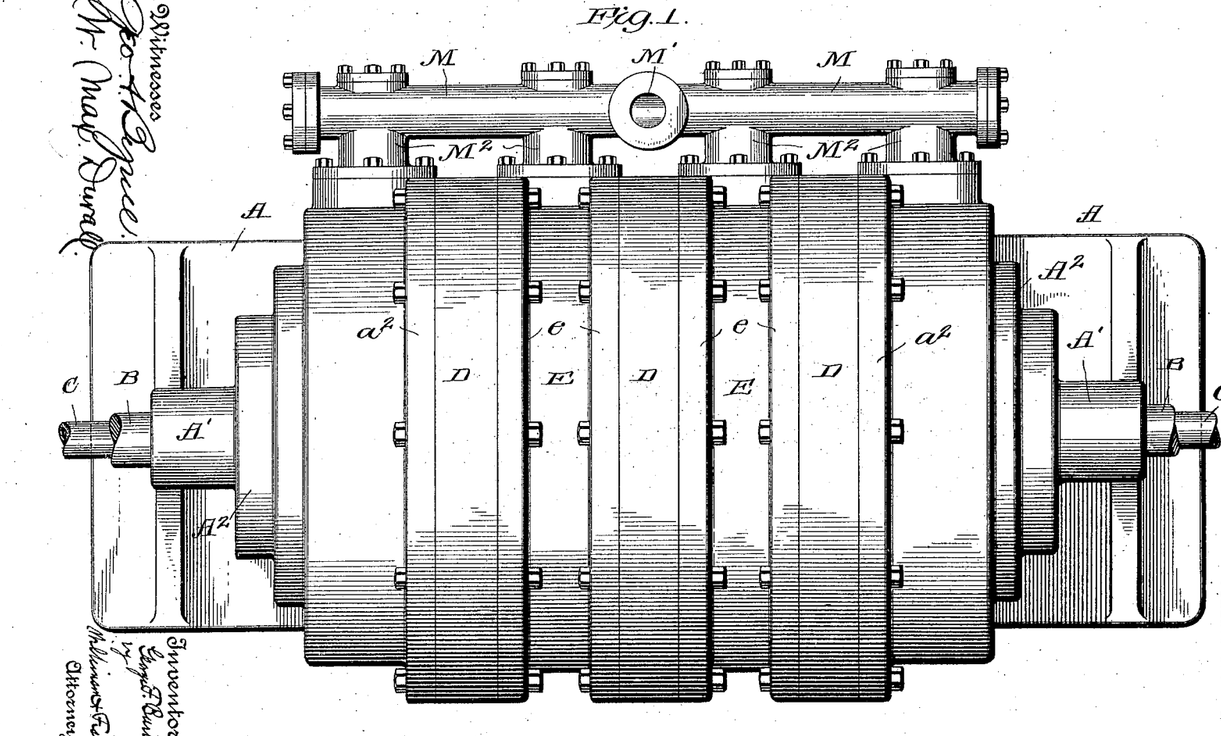
Figure 1 is a plan view of a four-cylinder rotary engine and of the steam-chest therefor.
Figure 2:
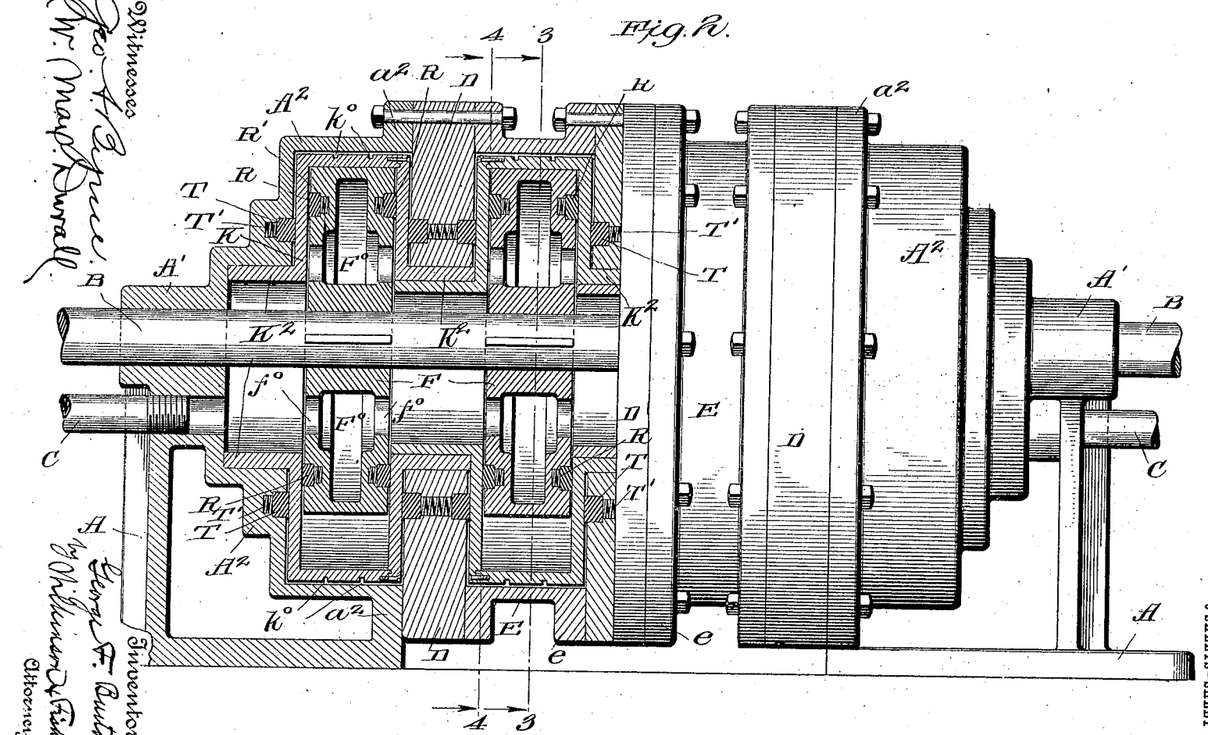
Fig. 2 is a front elevation, partly in central vertical section, and shows two of the cylinders closed and two in section.

In order to pack the exterior of the inner shells and to prevent leakage of steam outside of the apparatus, the packing-rings T are provided, which are pressed by springs T' against the end faces of the inner shell. In order to further secure a tight joint and steady motion, the inner shells are flanged, as at $k^2$, so as to rotate one flange within the other, as shown in Fig. 2. These flanges are journaled in the division-plates D and outer shells E and form journals on which the inner shells revolve.

Figure 4:
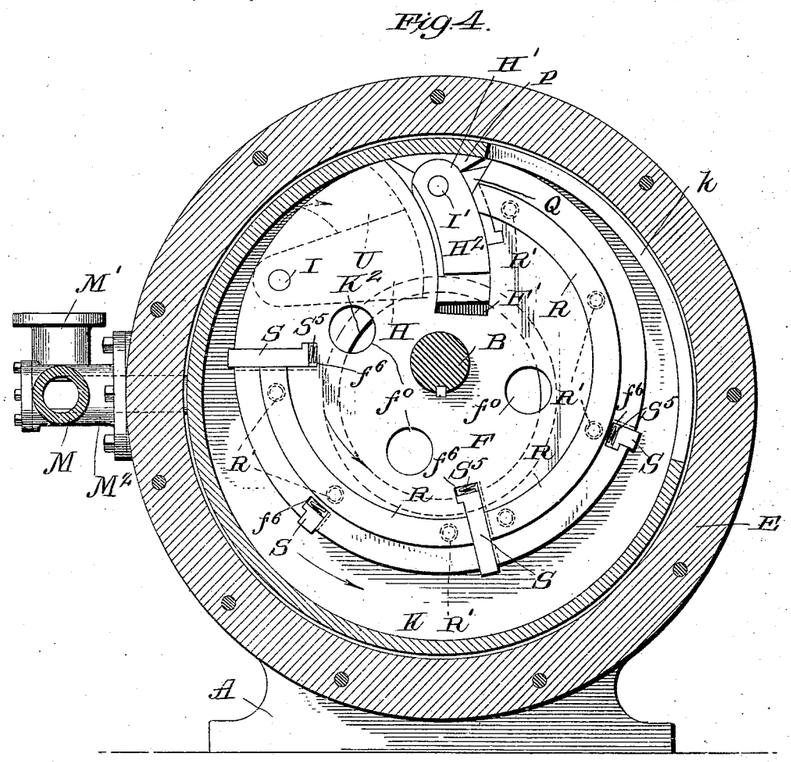
Fig. 4 shows a section along the line 4 4 of Fig. 2 and looking in the direction of the arrows, the parts being in the position for exhausting.
Figures 5, 6, 7:
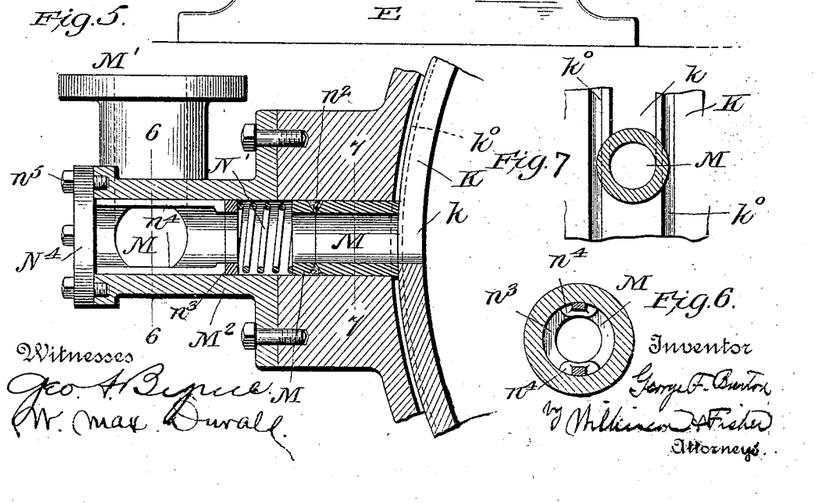
Fig. 5 shows an enlarged section across the steam-chest and illustrates one of the ports for admitting steam to one of the cylinders.
Fig. 6 shows a section along the line 6 6 of Fig. 5.
Fig. 7 shows a section along the line 7 7 of Fig. 5.
Figure 11:
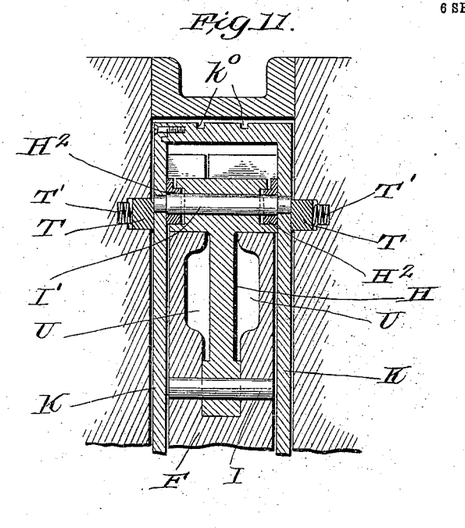
Fig. 11 shows a section through the piston and adjacent parts along the broken line 11 11 of Fig. 3 and looking in the direction of the arrows.
Figure 12:
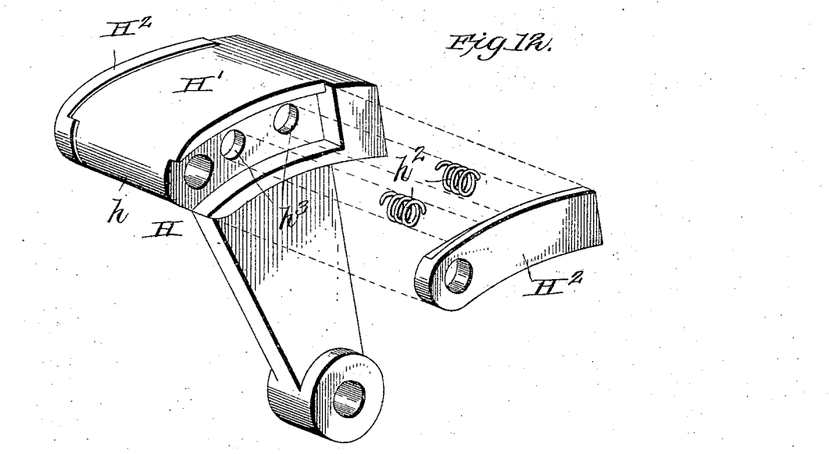
Fig. 12 is a detail showing the piston with the packing-bar and springs for holding same in engagement.
Figure 13:
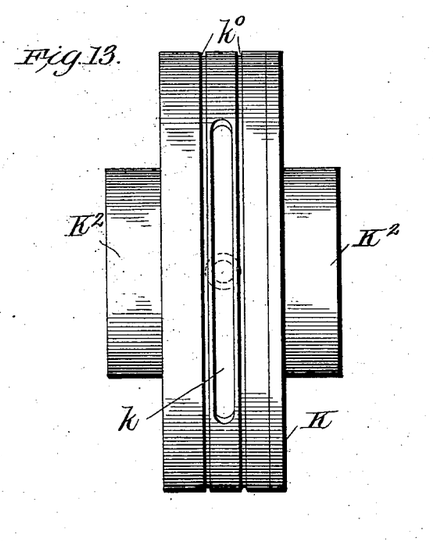
Fig. 13 is a side elevation of one of the inner shells which rotates with the disk.
Figure 14:
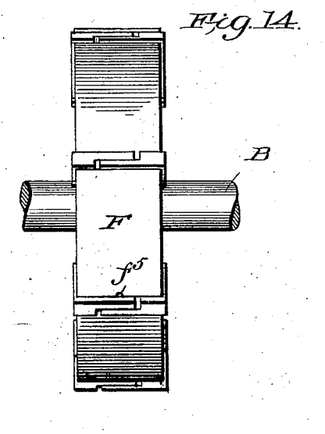
Fig. 14 is a side elevation of one of the disks which rotates within the shell shown in Fig. 13.

The operation of the device is as follows: Suppose the first disk to be in the position indicated in Fig. 3, with the steam-port just open and the steam entering from the steam-chest. The unbalanced pressure of the steam on the saddle P and the head of the piston would cause the disk to rotate to the left in the direction of the arrow X. The steam will follow until the end of the port $k$ passes beyond the steam-port $m$, when the steam will be automatically cut off, the bushing N, under pressure of the steam and of the spring N', forming a steam-tight joint with the inner shell. The steam will continue to act expansively until the steam side of the piston is connected to the exhaust, which is accomplished as follows: The exhaust-passage from the exterior of the disk to the interior thereof is back of the head of the piston, as indicated at U in Figs. 3, 4, and 11. The steam will be cut off from this exhaust-passage by means of the packing-blocks S until the last packing-block S<sup>u</sup> passes clear of the inner wall of the inner shell, due to the eccentric motion of the shell on the disk, which position is attained somewhat before the parts are in the position shown in Fig. 4. At this time, the steam being entirely cut off from the cylinder, the exhaust is opened, and the exhaust-steam is free to pass through the openings $f$ in the various disks and escape out through one or the other of the exhaust-pipes C.

By having the ports of the various cylinders symmetrically arranged relative to the shaft B the engine may be conveniently balanced. Thus where there are three cylinders it would be desirable to have the ports set one hundred and twenty degrees apart. Where there are four cylinders, as shown, the ports should preferably be ninety degrees apart, so that always one port is open, and steady running of the machine is attained.

By having the inner shell coupled onto the disk by means of the piston and the two pins I and I' the inner shell is free to partake of an eccentric motion relative to the main shaft, but with very little angular motion relative to the disk, so that there is very slight wear. The only appreciable wear that takes place is the wear on the bushing N, which may be readily taken care of by substituting fresh bushings when desired, and the wear between the rings T and the exterior of the inner shells K, and this is at a part of the machine exterior to the operating parts. This wear is of little moment and is taken care of by the springs T'.

Figure 18:
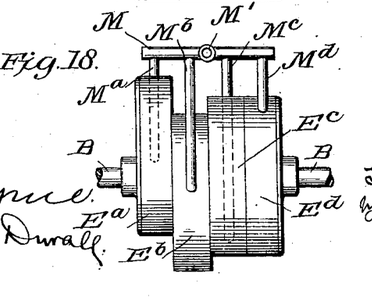
Fig. 18 shows diagrammatically a modification in which the cylinder may be supplied with steam in pairs.

Referring to Fig. 18, which is a diagram, the outer shells E<sup>a</sup>, E<sup>b</sup>, E<sup>c</sup>, and E<sup>d</sup> are grouped in pairs with their maximum eccentricity one hundred and eighty degrees apart. Thus the outer shells E<sup>a</sup> and E<sup>b</sup> project above and below the shaft B, while the outer shells E<sup>c</sup> and E<sup>b</sup> project behind and in front of the shaft, respectively, and the steam-chest M supplies steam simultaneously to the cylinders in pairs, but at opposite sides of the shaft B through the branch pipes M<sup>a</sup>, M<sup>b</sup>, M<sup>c</sup>, and M<sup>d</sup>. Thus the pressure is simultaneously applied to the disks in pairs, but from opposite sides of the shaft, causing the engine to run very smoothly.

While I have shown the invention as applied to a four-cylinder engine, each cylinder being fed directly with live steam from a common steam-chest, it will be obvious that the number of cylinders may be varied at will.

It will be obvious that independent sources of fluid-pressure may be applied to different groups of cylinders mounted on the same shaft or that the device may be arranged to be used as a compound engine by having the first cylinders smaller than the others and by exhausting directly from the exhaust side of the small cylinders into the steam side of the larger cylinders. These and various other modifications might be made by any one skilled in the art which could be used without departing from the spirit of my invention.

Having thus described my invention, what I claim, and desire to secure by Letters Patent of the United States, is—

1. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell, a substantially steam-tight piston pivotally connected to said disk and to said inner shell, and linking the two together, and a steam-port adapted to register with said elongated port during a portion of the rotation of the inner shell, substantially as described.

2. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with an inner chamber connected to the exhaust, a substantially steam-tight piston pivotally connected to said disk and to said inner shell, and linking the two together, and a steam-port adapted to register with said elongated port during a portion of the rotation of the inner shell, substantially as described.

3. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with an inner chamber connected to the exhaust, packing-blocks mounted radially in said disk and normally closing the passage to the exhaust, a substantially steam-tight piston pivotally connected to said inner shell, and linking the two together, and a steam-port adapted to register with said elongated port during a portion of the rotation of the inner shell, substantially as described.

4. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with an inner chamber connected to the exhaust, packing-blocks mounted radially in said disk, and normally closing the passage to the exhaust, means for limiting the radial travel of said packing-blocks relative to said disk, a substantially steam-tight piston pivotally connected to said inner shell, and linking the two together, and a steam-port adapted to register with said elongated port during a portion of the rotation of the inner shell, substantially as described.

5. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell, a substantially steam-tight piston pivotally connected to said disk and to said inner shell, and linking the two together, a steam-pipe and a steam-port therefrom, and a bushing mounted in said steam-port and automatically pressed toward said inner shell, substantially as described.

6. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with an inner chamber connected to the exhaust, a substantially steam-tight piston pivotally connected to said disk and to said inner shell, and linking the two together, a steam-pipe and a steam-port leading to the exterior of the inner shell in the plane of said elongated port, with a bushing mounted in said steam-port and automatically pressed toward said inner shell, substantially as described.

7. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with an inner chamber connected to the exhaust, packing-blocks mounted radially in said disk, and normally closing the passage to the exhaust, a substantially steam-tight piston pivotally connected to said disk and to said inner shell, and linking the two together, a steam-pipe and a steam-port leading to the exterior of the inner shell in the plane of said elongated port, with a bushing mounted in said steam-port and automatically pressed toward said inner shell, substantially as described.

8. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with an inner chamber connected to the exhaust, packing-blocks mounted radially in said disk, and normally closing the passage to the exhaust, means for limiting the radial travel of said packing-blocks relative to said disk, a substantially steam-tight piston pivotally connected to said disk and to said inner shell, and linking the two together, a steam-pipe and a steam-port leading to the exterior of the inner shell in the plane of said elongated port, with a bushing mounted in said steam-port and automatically pressed toward said inner shell, substantially as described.

9. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell, a substantially steam-tight piston pivotally connected to said disk and to said inner shell, and linking the two together, a wedge-shaped saddle held between said piston and said inner shell, and a steam-port adapted to register with said elongated port during a portion of the rotation of the inner shell, substantially as described.

10. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell, a substantially steam-tight piston pivotally connected to said inner shell, and linking the two together, a steam-pipe and a steam-port leading to the exterior of the inner shell in the plane of said elongated port, with a spring-impressed bushing of soft metal mounted in said steam-port and automatically pressed toward said inner shell, substantially as described.

11. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with a curved recess, a piston having a curved head adapted to swing into and out of said recess, said piston being pivotally connected to said disk and to said inner shell, and linking the two together, and a steam-port adapted to register with said elongated port during a portion of the rotation of the inner ring, substantially as described.

12. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with a curved recess, a piston having a curved head adapted to swing into and out of said recess, said piston being pivotally connected to said disk and to said inner shell, and linking the two together, a steam-pipe and a steam-port leading to the exterior of the inner shell on the plane of said elongated port, with a bushing made of soft metal mounted in said steam-port and automatically pressed toward said inner shell, substantially as described.

13. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with radial L-shaped recesses, L-shaped packing-blocks adapted to have a limited play in said recesses, an exhaust-passage uncovered by said radial packing-blocks at a predetermined position of the disk, a substantially steam-tight piston pivotally connected to said disk and to said inner shell, and linking the two together, and a steam-port adapted to register with said elongated port during a portion of the rotation of the inner shell, substantially as described.

14. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with radial L-shaped recesses, L-shaped packing-blocks adapted to have a limited play in said recesses, an exhaust-passage uncovered by said radial packing-blocks at a predetermined position of the disk, a substantially steam-tight piston pivotally connected to said disk and to said inner shell, and linking the two together, a steam-pipe and a steam-port leading to the exterior of the inner shell on the plane of said elongated port, with a bushing mounted in said steam-port and automatically pressed toward said inner shell, substantially as described.

15. In a rotary engine, the combination with an outer shell or casing, of a shaft eccentrically mounted in said outer shell or casing, a plurality of inner shells revolubly mounted in the outer shells and each provided with an elongated port, the said ports being symmetrically disposed about said shaft, a series of disks fast to said shaft and inclosed in said inner shells, a substantially steam-tight piston pivotally connected to each disk and to its inclosing inner shell, and linking the two together, and a steam-chest having ports adapted to register with the elongated port during a portion of the rotation of the corresponding inner shell, substantially as described.

16. In a rotary engine, the combination with an outer shell or casing, of a shaft eccentrically mounted in said outer shell or casing, a plurality of inner shells revolubly mounted in the outer shell and each provided with an elongated port, the said ports being symmetrically disposed about said shaft, a series of disks fast to said shaft and inclosed in said inner shells, each disk being provided with an inner chamber connected to the exhaust, packing-blocks mounted radially in each disk and normally closing the passage therethrough to the exhaust, a substantially steam-tight piston pivotally connected to each disk and to its inclosing inner shell, and linking the two together, and a steam-chest having ports adapted to register with the elongated port during a portion of the rotation of the corresponding inner shell, substantially as described.

17. In a rotary engine, the combination with an outer shell or casing, of a shaft eccentrically mounted in said outer shell or casing, a plurality of inner shells revolubly mounted in the outer shells and each provided with an elongated port, the said ports being symmetrically disposed about said shaft, a series of disks fast to said shaft and inclosed in said inner shells, each disk being provided with an inner chamber connected to the exhaust, packing-blocks mounted radially in said disk, and normally closing the passage therethrough to the exhaust, means for limiting the radial travel of said packing-blocks relative to said disk, a substantially steam-tight piston pivotally connected to each disk and to its inclosing inner shell, and linking the two together, and a steam-chest having ports adapted to register with the elongated port during a portion of the rotation of the corresponding inner shell, substantially as described.

18. In a rotary engine, the combination with an outer shell or casing, of a shaft eccentrically mounted in said outer shell or casing, a plurality of inner shells revolubly mounted in the outer shell and each provided with an elongated port, the said ports being symmetrically disposed about said shaft, a series of disks fast to said shaft and inclosed in said inner shells, a substantially steam-tight piston pivotally connected to each disk and to its inclosing inner shell, and linking the two together, a steam-chest provided with a series of steam-ports leading to the exterior of the inner shells in the plane of said elongated ports, with a bushing mounted in each steam-port and automatically pressed toward said inner shell, substantially as described.

19. In a rotary engine, the combination with an outer shell or casing, of a shaft eccentrically mounted in said outer shell or casing, a plurality of inner shells having axial flanges, revolubly mounted in the outer shells, and each provided with an elongated port, the said ports being symmetrically disposed about said shaft, stationary spacing-plates mounted between said inner shells and partially engaging said axial flanges, a series of disks fast to said shaft and inclosed in said inner shells, a substantially steam-tight piston pivotally connected to each disk and to its inclosing inner shell, and linking the two together, and a steam-chest having ports adapted to register with the elongated port during a portion of the rotation of the corresponding inner shell, substantially as described.

20. In a rotary engine, the combination with an outer shell or casing, of a shaft eccentrically mounted in said outer shell or casing, a plurality of inner shells having axial flanges, revolubly mounted in the outer shells, and each provided with an elongated port, the said ports being symmetrically disposed about said shaft, stationary spacing-plates mounted between said inner shells and partially engaging said axial flanges, with packing-rings between said spacing-plates and said inner shells, a series of disks fast to said shaft and inclosed in said inner shells, a substantially steam-tight piston pivotally connected to each disk and to its inclosing inner shell, and linking the two together, and a steam-chest having ports adapted to register with the elongated ports during a portion of the rotation of the corresponding inner shell, substantially as described.

21. In a rotary engine, the combination with an outer shell or casing, of a shaft eccentrically mounted in said outer shell or casing, a plurality of inner shells having axial flanges, revolubly mounted in the outer shells, and each provided with an elongated port, the said ports being symmetrically disposed about said shaft, stationary spacing-plates mounted between said inner shells and partially engaging said axial flanges, the said spacing-plates being perforated axially, a series of disks fast to said shaft and inclosed in said inner shells, each disk being provided with an inner chamber connected to said axial perforations and connected to the exhaust, packing-blocks mounted radially in each disk and normally closing the passage therethrough to the exhaust, a substantially steam-tight piston pivotally connected to each disk and to its inclosing inner shell, and linking the two together, and a steam-chest having ports adapted to register with the elongated ports during a portion of the rotation of the corresponding inner shell, substantially as described.

22. In a rotary engine, the combination with an outer shell or casing, of a shaft eccentrically mounted in said outer shell or casing, a plurality of inner shells having axial flanges, revolubly mounted in the outer shells, and each provided with an elongated port, the said ports being symmetrically disposed about said shaft, stationary spacing-plates mounted between said inner shells and partially engaging said axial flanges, the said spacing-plates being perforated axially, a series of disks fast to said shaft and inclosed in said inner shells, each disk being provided with an inner chamber connected to said axial perforations and connected to the exhaust packing-blocks mounted radially in each disk and normally closing the passage therethrough to the exhaust, packing-rings between said spacing-plates and said inner shells, exterior to said inner chamber and said axial passages, a substantially steam-tight piston pivotally connected to each disk and to its inclosing inner shell, and linking the two together, and a steam-chest having ports adapted to register with the elongated ports during a portion of the rotation of the corresponding inner shell, substantially as described.

23. In a rotary engine, the combination with an outer shell or casing, of a shaft eccentrically mounted in said outer shell or casing, a plurality of inner shells revolubly mounted in the outer shell and each provided with an elongated port, the said ports being symmetrically disposed about said shaft, a series of disks fast to said shaft and inclosed in said inner shells, a substantially steam-tight piston pivotally connected to each disk and to its inclosing inner shell, and linking the two together, a steam-chest provided with a series of steam-ports leading to the exterior of the inner shells in the plane of said elongated ports, with a bushing mounted to slide in each steam-port, and a spring normally pressing said bushing toward said inner shell, substantially as described.

24. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with radial L-shaped recesses, L-shaped packing-blocks made in two parts with interposed springs, adapted to have a limited play in said recesses, and exhaust-passage uncovered by said radial packing-blocks at a predetermined position of the disk, a substantially steam-tight piston pivotally connected to said disk and to said inner shell, and linking the two together, and a steam-pipe and a steam-port leading to the exterior of the inner shell in the plane of said elongated port, substantially as described.

25. In a rotary engine, the combination with an outer shell or casing, of a shaft eccentrically mounted in said outer shell or casing, an inner shell revolubly mounted in the outer shell and provided with an elongated port, a driving-disk carried by said shaft and inclosed in and linked to said inner shell, a steam-port adapted to register with said elongated port during a portion of the rotation of the inner shell, and a bushing mounted to slide in said steam-port, and to bear against said inner shell in the plane of said elongated port, substantially as described.

26. In a rotary engine, the combination with an outer shell or casing, of a shaft eccentrically mounted in said outer shell or casing, an inner shell revolubly mounted in the outer shell and provided with an elongated port, a driving-disk carried by said shaft and inclosed in and linked to said inner shell, a steam-port adapted to register with said elongated port during a portion of the rotation of the inner shell, and a bushing mounted to slide in said steam-port, and to bear against said inner shell in the plane of said elongated port, substantially as described.

27. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with a curved recess, a piston having a curved head adapted to swing into and out of said recess, with curved shoulders abutting against the face of said recess, said piston being pivotally connected to said disk and to said inner shell, and linking the two together, and a steam-port adapted to register with said elongated port during a portion of the rotation of the inner shell, substantially as described.

28. In a rotary engine, the combination with an outer shell or casing, of a shaft eccentrically mounted in said outer shell or casing, an inner shell revolubly mounted in the outer shell and provided with an elongated port, a disk carried by said shaft and inclosed in said inner shell and provided with a curved recess, a piston having a curved head adapted to swing into and out of said recess with curved shoulders abutting against the face of said recess, said piston being pivotally connected to said disk and to said inner shell, and linking the two together, a steam-pipe and a steam-port leading to the exterior of the inner shell in the plane of said elongated port, with a bushing made of soft metal mounted to slide in said steam-port, and a spring normally pressing said bushing toward said inner shell, substantially as described.

29. In a rotary engine, the combination with an outer shell or casing, of a shaft eccentrically mounted in said outer shell or casing, a plurality of inner shells having axial flanges, revolubly mounted in the outer shells and each provided with a steam-port, the said ports being symmetrically disposed about said shaft, stationary spacing-plates mounted between said inner shells and partially engaging said axial flanges, a series of disks fast to said shaft and inclosed in said inner shells, a substantially steam-tight piston pivotally connected to each disk and to its inclosing inner shell, and linking the two together, and a steam-chest having ports adapted to register with the ports in the inner shells, during a portion of the rotation of the corresponding inner shell, substantially as described.

30. In a rotary engine, the combination with an outer shell or casing, of a shaft eccentrically mounted in said outer shell or casing, a plurality of inner shells having axial flanges, revolubly mounted in the outer shells, and each provided with a steam-port, the said ports being symmetrically disposed about said shaft, stationary spacing-plates mounted between said inner shells and partially engaging said axial flanges, with packing-rings between said spacing-plates and said inner shells, a series of disks fast to said shaft and inclosed in said inner shells, a substantially steam-tight piston pivotally connected to each disk and to its inclosing inner shell, and linking the two together, and a steam-chest having ports adapted to register with the ports in the inner shells during a portion of the rotation of the corresponding inner shell, substantially as described.

31. In a rotary engine, the combination with an outer shell or casing, of a shaft eccentrically mounted in said outer shell or casing, a plurality of inner shells having axial flanges, revolubly mounted in the outer shells, and each provided with a steam-port, the said ports being symmetrically disposed about said shaft, stationary spacing-plates mounted between said inner shells and partially engaging said axial flanges, the said spacing-plates being perforated axially, a series of disks fast to said shaft and inclosed in said inner shells, each disk being provided with an inner chamber connected to said axial perforations and connected to the exhaust, packing-blocks mounted radially in each disk and normally closing the passage therethrough to the exhaust, a substantially steam-tight piston pivotally connected to each disk and to its inclosing inner shell, and linking the two together, and a steam-chest having ports adapted to register with the ports in the inner shells during a portion of the rotation of the corresponding inner shell, substantially as described.

32. In a rotary engine, the combination with an outer shell or casing, of a shaft eccentrically mounted in said outer shell or casing, a plurality of inner shells revolubly mounted in the outer shell and each provided with a raised rib slotted to form a steam-port, the said ports being symmetrically disposed about said shaft, a series of disks fast to said shaft and inclosed in said inner shells, a substantially steam-tight piston pivotally connected to each disk and to its inclosing inner shell, and linking the two together, a steam-chest provided with a series of steam-ports leading to the exterior of the inner shells in the plane of said steam-ports, with a removable bushing mounted to slide in each steam-port, and a spring normally pressing said bushing toward said rib on said inner shell, substantially as described.

33. In a rotary engine, the combination with an outer shell or casing, of a shaft eccentrically mounted in said outer shell or casing, an inner shell revolubly mounted in the outer shell and provided with a raised rib slotted to form an elongated port, a driving-disk carried by said shaft and inclosed in and linked to said inner shell, a steam-port adapted to register with said elongated port during a portion of the rotation of the inner shell, and a removable bushing mounted to slide in said steam-port, and to bear against said raised rib on the inner shell in the plane of said elongated port, substantially as described.

34. In a rotary engine, the combination with an outer shell or casing, of a shaft eccentrically mounted in said outer shell or casing, an inner shell revolubly mounted in the outer shell and provided with a raised rib slotted to form an elongated port, a driving-disk carried by said shaft and inclosed in and linked to said inner shell, a steam-port adapted to register with said elongated port during a portion of the rotation of the inner shell, and a spring-impressed removable bushing mounted to slide in said steam-port and to bear against said raised rib on the inner shell, substantially as described.

35. In a rotary engine, the combination with an outer shell or casing, of a shaft eccentrically mounted in said outer shell or casing, an inner shell revolubly mounted in the outer shell and provided with a steam-port, a disk carried by said shaft and inclosed in said inner shell and provided with a curved recess, a piston having a curved head adapted to swing into and out of said recess, with curved shoulders abutting against the face of said recess, said piston being pivotally connected to said disk and to said inner shell, and linking the two together, and a steam-port adapted to register with said port on the inner shell during a portion of the rotation of said inner shell, substantially as described.

36. In a rotary engine, the combination with an outer shell or casing, of a shaft eccentrically mounted in said outer shell or casing, an inner shell revolubly mounted in the outer shell and provided with a steam-port, a disk carried by said shaft and inclosed in said inner shell and provided with a curved recess, a piston having a curved head adapted to swing into and out of said recess with curved shoulders abutting against the face of said recess, said piston being pivotally connected to said disk and to said inner shell, and linking the two together, a steam-pipe and a steam-port leading to the exterior of the inner shell in the plane of said steam-port in the inner shell, with a removable bushing made of soft metal mounted to slide in said steam-port, and a spring normally pressing said bushing toward said inner shell, substantially as described.

In testimony whereof I affix my signature in presence of two witnesses.

GEORGE F. BURTON.

Witnesses:
A. L. HOUGH,
W. MAX DUVALL.